United States Patent [19]

Mikuriya et al.

[11] Patent Number: 4,850,695
[45] Date of Patent: Jul. 25, 1989

[54] TEST SYSTEM FOR OPTICAL DISKS

[75] Inventors: Kenta Mikuriya; Akira Ohya; Minoru Nakagawara; Hideo Hirukawa; Shoji Uehara, all of Tokyo, Japan

[73] Assignee: Yokogawa Electric Corporation, Tokyo, Japan

[21] Appl. No.: 101,586

[22] Filed: Sep. 28, 1987

[30] Foreign Application Priority Data

Dec. 18, 1986 [JP] Japan ................................ 61-302187

[51] Int. Cl.$^4$ ............................................. G01N 21/88
[52] U.S. Cl. ..................................... 356/237; 250/201; 369/46; 369/53
[58] Field of Search ....................... 356/237, 239, 243; 369/45, 46, 53; 250/252.1, 201

[56] References Cited

U.S. PATENT DOCUMENTS

4,502,134 2/1985 Kondo et al. .......................... 369/46
4,508,450 4/1985 Ohshima et al. ..................... 356/237

Primary Examiner—Vincent P. McGraw
Assistant Examiner—S. A. Turner
Attorney, Agent, or Firm—Moonray Kojima

[57] ABSTRACT

A test system for optical disks, comprising a spindle motor for clamping and rotating an optical disk at a constant speed; an encoder for generating a pulse output corresponding to the angle of rotation of the motor; a measuring head comprising focus and tracking servo mechanisms for causing the focal point of a laser beam irradiating the disk to follow the guide groove thereof, and a displacement detector for optically detecting the displacement of a focusing lens driven by the servo mechanisms; the measuring head being operative to generate an output signal proportional to the displacement of the focusing lens; a feed mechanism for moving the measuring head in the radial direction of the disk; a control circuit for controlling the operations of the motor, the servo mechanisms and the feed mechanism; an analog to digital converter for converting the output of the measuring head at a timing according to the pulse output of the encoder; and a computer for commanding the control circuit and for computing the output of the analog to digital converter to determine the shape of the disk, whereby displacement of the focusing lens is directly detected by the displacement detector.

7 Claims, 11 Drawing Sheets

TEST SYSTEM FOR OPTICAL DISKS

BACKGROUND OF THE INVENTION

1. Field of Invention

This invention relates to an optical disk test system for measuring the mechanical characteristics of optical disks.

2. Description of Prior Art

The mechanical characteristics of an optical disk concern the shape thereof, such as axial runout or concentricity, and are associated with how effective focusing and tracking servos are. As to the focus servo, the thickness of the substrate is important in relation to aberration, and the axial runout and its high frequency component, ie. acceleration, is important from the view point of controllability. As to the tracking servo, the tilt, concentricity and radial acceleration (i.e. circularity) are important factors.

Figure 1:
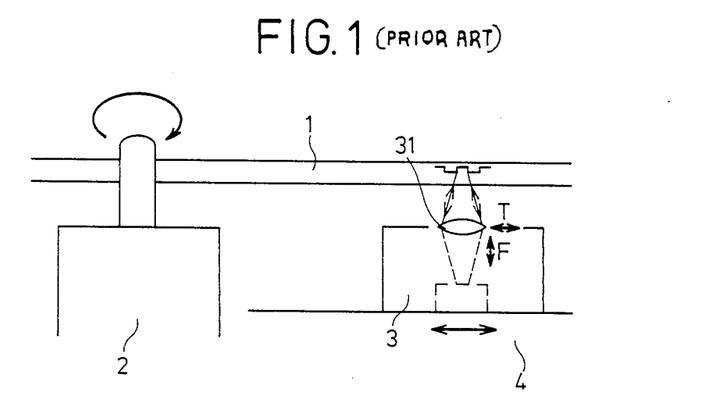
FIG. 1 is a diagram depicting a prior art optical disk test system.

FIG. 1 depicts a conventional optical disk test system comprising an optical disk 1; a spindle motor 2 for clamping and rotating disk 1 at a constant speed; and a measuring head 3 comprising focus servo and tracking servo mechanisms for causing the focal point of a laser beam irradiating disk 1 to follow the guide groove of disk 1, and a displacement detector for optically detecting the displacement of a focusing lens 31 driven by the focus and tracking servo mechanisms. Measuring head 3 generates an output signal proportional to the displacement of focusing lens 31. Numeral 4 denotes measuring head 3 being in the radial direction of disk 1.

The test system functions similar to a reproducing system, and focusing lens 31 is subjected to servo control in a focusing direction F and in a tracking direction T so that the position in the reproducing state of the guide groove of disk 1 may be irradiated with the laser beam. Thus, if the displacements in the two directions F and T of focusing lens 31 at this time are detected, it is possible to measure the magnitudes of the axial runout and concentricity of disk 1. Noting the displacement in the focusing direction, for example, it is possible to measure the axial runout, the runout acceleration, the tilt and the substrate thickness. Noting the displacement in the tracking direction, it is possible to measure the concentricity and radial acceleration (i.e. the roundness).

For detecting the foregoing displacements of focusing lens 31, the drive current of a lens actuator for displacing focusing lens 31 is utilized, or a differential transformer or a capacity type displacement sensor is used. In case the displacement of focusing lens 31 is detected by making use of the drive current as above, the detection is affected by the frequency characteristics, hysteresis and frictional force of the lens actuator so that the displacement of focusing lens 31 cannot be accurately detected.

Since the differential transformer or capacity type displacement sensor is a detector detecting a one dimensional displacement, two independent detectors must be used for detecting the displacement of focusing lens 31 in the focusing direction F and in the tracking direction T. Since interference occurs between the servo mechanisms of the focusing and tracking directions F and T, the outputs of the individual detectors must be corrected so as to eliminate these influences.

It can thus be appreciated that the conventional test systems have many deficiencies and disadvantages.

SUMMARY OF THE INVENTION

Accordingly, an object of the invention is to overcome the aforementioned deficiencies and defects of the prior art.

Another object is to provide a simple optical disk test system which can eliminate the above drawbacks of the prior art, detect the displacements of the focusing lens accurately in the focusing and tracking directions and accurately measure the mechanical characteristics of the optical disks.

The foregoing and other objects and features are attained by the invention which encompasses a test system for optical disks comprising a spindle motor for clamping and rotating an optical disk at a constant speed; an encoder for generating a pulse output corresponding to the angle of rotation of the spindle motor; a measuring head comprising focus servo and tracking servo mechanisms for causing the focal point of a laser beam irradiating the disk to follow the guide groove of the disk, and a displacement detector for optically detecting the displacement of a focusing lens driven by the two servo mechanisms, the measuring head being operative to generate an output signal proportional to the displacement of the focusing lens; a feed mechanism for moving the measuring head in the radial direction of the disk; a control circuit for controlling the operations of the spindle motor, the focus servo mechanism, the tracking servo mechanism, and the feed mechanism; an analog to digital converter for analog to digital converting of the output of the measuring head at a timing according to the pulse output of the encoder; and a computer for commanding the control circuit and for computing the output of the analog to digital converter to determine the shape of the optical disk, whereby the displacement of the focusing lens of the measuring head is directly detected by means of the displacement detector.

DETAILED DESCRIPTION OF THE PREFERRED EMBODIMENTS

Figure 2:
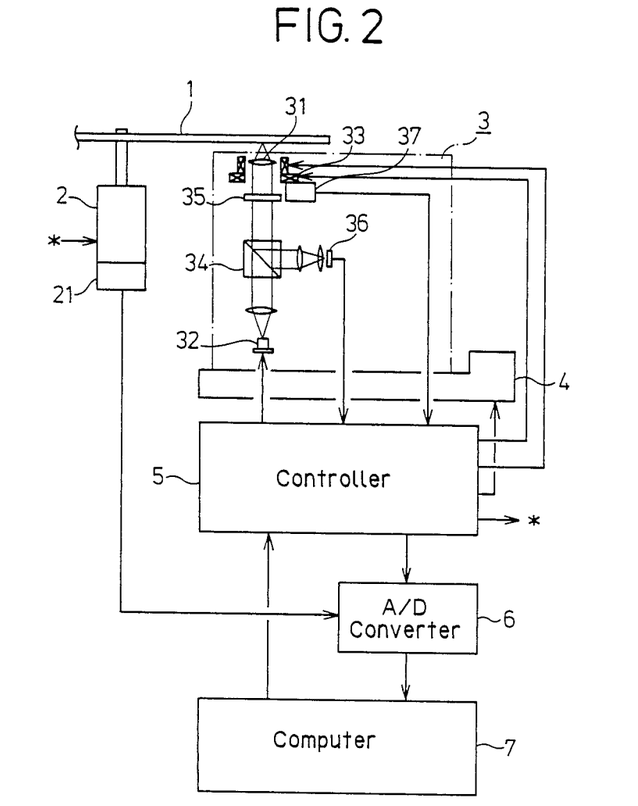
FIG. 2 is a diagram depicting an illustrative embodiment of the invention.

In FIG. 2, the components which are similar to those of FIG. 1 bear the same reference numerals. The system comprises an encoder 21 for generating a pulse output according to the angle of rotation of spindle motor 2; and a measuring head 3 comprising focusing lens 31, a laser beam source 32, a lens actuator 33, a beam splitter 34, a quarter wave (λ/4) plate 35, a light receiving element 36 and a displacement detector 37. In measuring head 3, the focal state on disk 1 is detected by element 36 to generate feedback signals for the focusing and tracking servo mechanisms. The displacement of focusing lens 31 is detected by detector 37 to generate an output signal proportional to the displacement of focusing lens 31. Detector 37 is of the optical type for converting the displacement of focusing lens 31 into changes in the amount of light. The system further comprises a controller 5 for driving lens actuator 33, in accordance with the output of light receiving element 36, to operate the focus servo mechanism and the tracking servo mechanism and controls the operations of spindle motor 2 and feed mechanism 4, an analog to digital converter 6 (also referred to as "A/D converter") for analog to digital converting the output signal from measuring head 3 at a timing according to the pulse output of encoder 21; and a computer 7 for commanding controller 5 and for computing the output of A/D converter 6 to determine the shape of disk 1. The operation sequence of the individual portions are selected in response to the commands of computer 7, and a variety of mechanical characteristics of disk 1, such as the axial runout or concentricity, are measured on the basis of these displacements.

Figure 3:
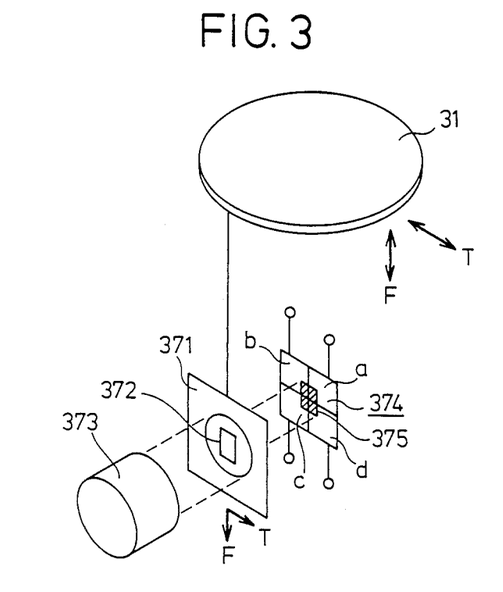
FIG. 3 is a diagram depicting a displacement detector used in the invention.

In FIG. 3, the parts similar to those in FIG. 2 bear the same numerals. The displacement detector of FIG. 3 comprises a shielding plate 371 having a rectangular aperture 372 and fixed on focusing lens 31; a light source 373 for irradiating shielding plate 371 with a parallel beam having a spot diameter larger than the moving range of aperture 372; and a multi-divided sensor 374 made receptive of a beam spot 375 having passed through aperture 372 of plate 371 for locating the position thereof. Sensor 374 is exemplified by a four divided sensor. On the other hand, plate 371 is arranged in a plane containing two displacing directions F and T of focusing lens 31 and is displaced two dimensionally with the displacement of focusing lens 31.

As a result, if focusing lens 31 is displaced in the focusing direction F and the tracking direction T by the servo mechanisms, plate 371 is also displaced in the directions F and T so that the position of incidence of beam spot 375 on multi-divided sensor 374 is accordingly shifted.

The multi-divided sensor 374 (being in this cases divided into 4 parts) is formed with four light receiving faces or quadrants a to d for generating output signals Sa to Sd proportional to the amount of light of the beam incident upon the individual quadrants. As a result, if beam spot 375 changes its incidence position in accordance with the displacement of shielding plate 371, the magnitudes of, or the balance among, those four output signals Sa to Sd will change. Thus, by arithmetically processing these output signals Sa to Sd, the displacements of plate 371, i.e. the focusing lens 31 in the two directions F and T, can be simultaneously determined.

Specifically, the displacement Vf of the focusing lens 31 in the focusing direction F is expressed by the following equation.

$$Vf = Sa + Sb - Sc - Sd$$

Likewise, the displacement Vt in the tracking direction T is expressed by the following equations.

$$Vt = Sa - Sb - Sc + Sd$$

Figure 4:
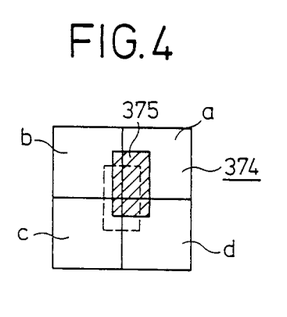
FIG. 4 is a diagram depicting the incident state of a beam spot on a multi-divided sensor of the system of FIG. 3.

On the other hand, FIG. 4 shows the incident state of beam spot 375 on multi-divided sensor 374. Since the beam spot 375 incident upon the multi-divided sensor 374 is rectangular, as shown, the amounts, or areas, of light of beam spot 375 incident upon the light receiving faces a to d of the individual quadrants are proportional to the displacement of the shielding plate 371 so that a high linearity is attained. The reason the beams spot 375, or aperture 372, is made to be rectangular is to provide sensitivities in the displacement directions F and T. If the sides which are perpendicular to the direction T is made longer, the sensitivity to the displacement in the direction T will be enhanced. This means that the sensitivities in the directions F and T can be equalized if the shape of the beam spot 375, or aperture 372, is made square.

Thus, if plate 371 is fixed on lens 31 so that its motions are detected by multi-divided sensor 374, the two directional displacements of lens 31 can be converted as they are into the two dimensional motions of plate 371 so that the displacements of lens 31, i.e., the concentricity and axial runout of disk 1, can be accurately measured by a single detector, for example, the multi-divided sensor 374. Moreover, since the displacements in the focusing direction F and the tracking direction T are measured simultaneously, the influences due to the interference between the two servo mechanisms are eliminated.

In the foregoing description, the individual sides of aperture 372 of plate 371 and the dividing axes of the light receiving faces a to d of sensor 374 are oriented to be in parallel with the directions of displacement F and T of the focusing lens 31, or shielding plate 371, as desired. In case these relations are disturbed, due to the mounting errors of the individual elements so that errors occur in the measurements, the errors are corrected in an arithmetic circuit.

Figure 5:
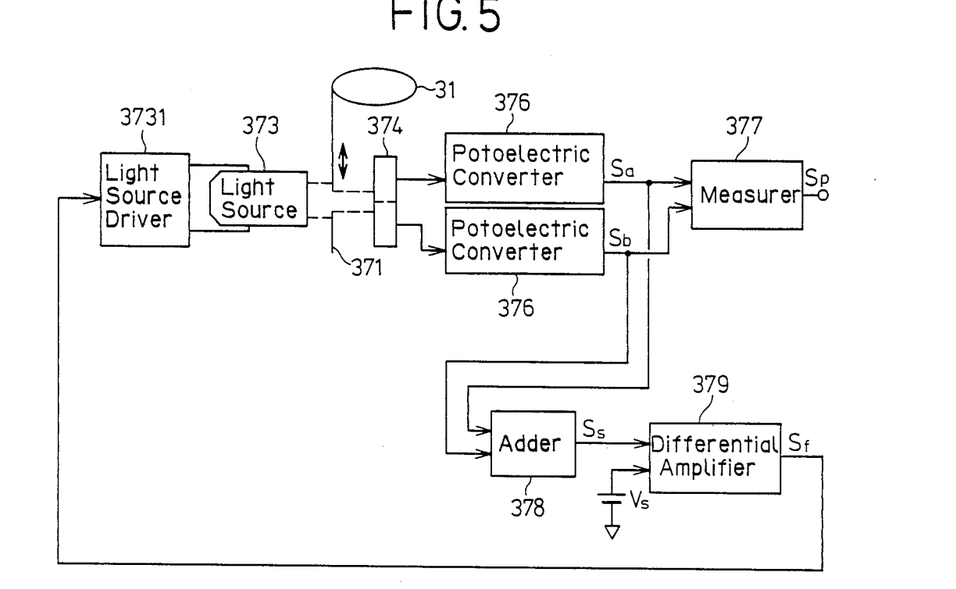
FIG. 5 is a diagram depicting another displacement detector.

FIG. 5 depicts another displacement detector which detects the total sum of the output signals coming from the individual light receiving faces of the multi-divided sensor and controls the emission of the light source so that the total sum may always be constant, to thereby compensate for the reduction in linearity due to the intensity distribution of the light and without any span change due to aging. In FIG. 5, the detector comprises a light source driver 373 for driving light source 373; photoelectric converters 376 for converting the amounts of light of the individual light receiving faces of multi-divided sensor 374 into electric signals Sa and Sb; measurer 377 for processing output signals Sa and Sb of converters 376 to generate an output Sp corresponding to the displacement of shielding plate 371; adder 378 for determining the total sum of output signals Sa and Sb; and differential amplifier 379 for comparing output Ss of adder 378 with a constant threshold level Vs to feed back a differential signal Sf to light source driver 3731. For simplicity of discussion, plate 371 is made movable only in the direction of one axis, and the multi-divided sensor 374 is a two part sensor.

In the detector, the balance in the amount of incident light on sensor 374 will change if plate 371 is displaced in accordance with displacement of focusing lens 31. This makes a difference between output signals Sa and Sb of the two photoelectric converters 376. Since this difference between output signal Sa and output signal Sb is proportional to the displacement of plate 371, output Sp obtained from measurer 377 is proportional to the displacement of plate 371, i.e. the focusing lens 31.

On the other hand, adder 378 and differential amplifier 379 constitute together a feedback circuit for detecting the total sum of output signals Sa and Sb of the respective light receiving faces of the multi-divided sensor 374 to control the emission of light of light source 373 such that the total sum will always take a constant value. As a result, in case the light emitted from light source 373 has an intensity distribution so that the amount of light incident upon the sensor 374 changes in accordance with the displacement of plate 371, the emission of source 373 is so controlled that the amount of incident light will be constant.

The feedback circuit will now be described with reference to FIGS. 6(A), 6(B) and 6(C) which show changes in the amount of incident light in sensor 374. First, if the intensity distribution P of light is even in the direction of movement x of the plate 371, as shown in FIG. 6(A), the amount of incident light upon the respective light receiving faces are proportional to areas S1 and S2, if these areas S1 and S2 are those of the beam spots incident upon the respective light receiving faces of sensor 374, so that the output signal Sp obtained from measurer 377 is proportional to the displacement of plate 371.

Figures 6A, 6B, 6C:
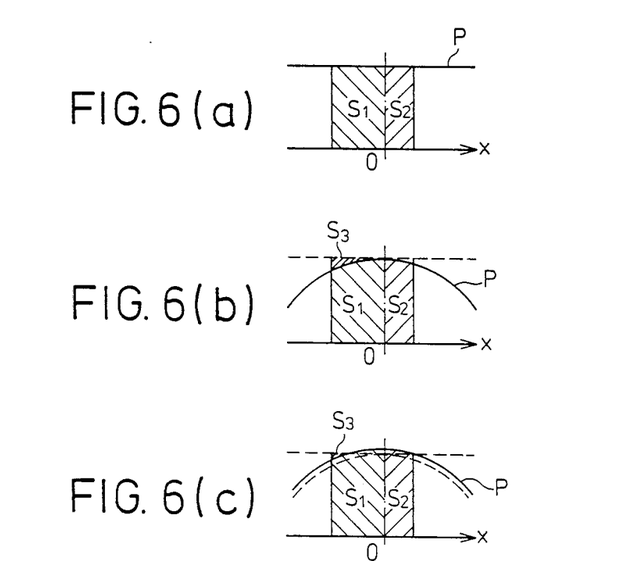
FIGS. 6(A), 6(B), and 6(C) are diagrams depicting changes in amount of incident light on the multi-divided sensor of FIG. 5.

In case the intensity of distribution P is not even, as shown in FIG. 6(B), the outputs Sa and Sb of sensor 374 are proportional to the area below the curve P so that their difference is not proportional to the displacement, even if the shielding plate 371 is displaced, to have non-linear error according to area S3.

Thus, if the feedback is made such that the total sum Ss of the output signals Sa and Sb coming from the respective light receiving faces of sunsor 374 takes a constant value, the intensity P changes, as shown in FIG. 6(C), to reduce the area S3. As a result, output Sp of measurer 377 approaches a value proportional to the displacement of plate 371 so that it is highly linear irrespective of the intensity distribution of the light.

If the intensity distribution P can be approximated by the following equation, for example, its linearity can be improved by a ratio of about 43%.

$$P = -0.1x^2 + 1$$

If this feedback is made, the amount of emission can be maintained constant so that no measurement span will change, even in case the emission efficiency drops due to the aging of the light source 373.

The individual items of measurement will now be described. The axial runout is measured in terms of the displacement of focusing lens 31 in the focusing direction and is differentiated twice or subjected to Fourier transformation and is expanded on the frequency axis to determine the axial acceleration. On the other hand, the tilt is calculated from the axial runouts at four points around the measurement point.

The concentricity is difference between the center of the guide groove of disk 1 and the center of rotation of spindle motor 2 and is measured in terms of the displacement of focusing lens 31 in the tracking direction. The concentricity is differentiated twice or subjected to Fourier transformation and expanded on the frequency axis to determine its radial acceleration. On the other hand, the circularity is determined in terms of difference between the inscribed and circumscribed circles of the measured concentricity values.

Figure 7:
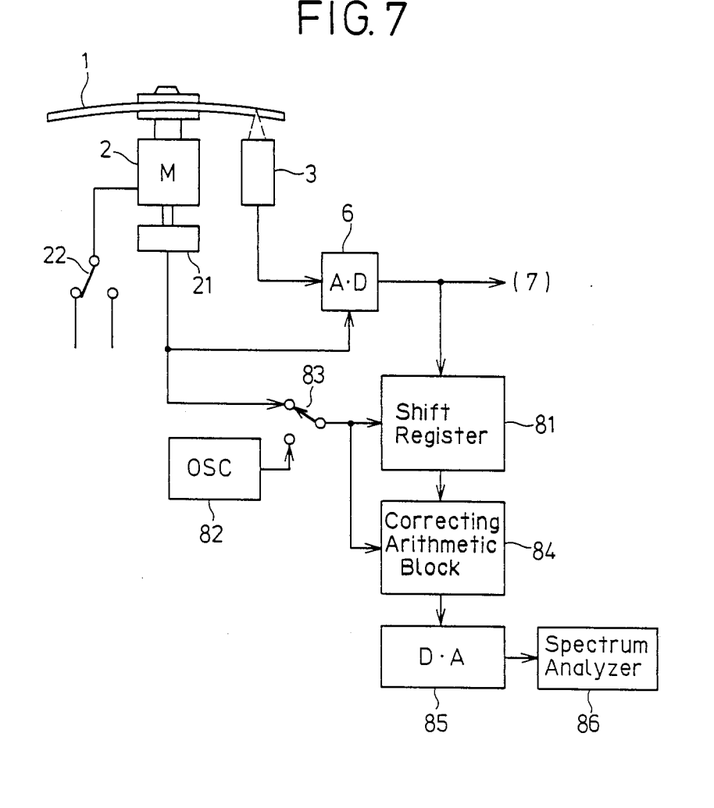
FIG. 7 is a diagram depicting a system for measuring axial runout and concentricity.

FIG. 7 depicts a system for measuring the axial runout and concentricity, wherein the guide groove of disk 1 is subjected to the focusing and tracking servos to measure the axial runout and concentricity. Then, the measurements are conducted with disk 1 being rotated at a speed lower than the rated speed. At the same time, the output of A/D converter 6 is temporarily stored in accordance with the pulse signal of a frequency proportional to the rotating speed so that the data are read out, if their analog signal processing is required, in accordance with the pulse signal of the frequency proportional to the rated rotating speed until they are subjected to digital-to-analog conversion (referred to as "D/A conversion").

Thus, if disk 1 is rotated at the low speed, the ordinary servo mechanisms are enabled to follow, even in case the characteristic, such as runout acceleration, of disk 1 are difficult for the servo mechanism to follow, so that the characteristics can be measured. In case the number of rotations is low, the output of encoder 21 is proportional to the angle of rotation of disk 1. Since the correspondence between the output, at the measurement point, of encoder 21 and the measured output is unchanged, the arithmetic processing of the measured data by computer 7 presents no substantial problem.

The measuring system comprises a changeover switch 22 for changing the rotating speed of spindle motor 2; a shift register 81; an oscillator 82 for generating a pulse signal having a frequency proportional to the rated rotating speed; a second changeover switch 83; a correcting arithmetic block 84; a digital to analog converter 85; and analog meter 86 such as a spectrum analyzer.

In a measurement state, the output signal of A/D converter 6, having been analog to digital converted at a timing according to the output of encoder 21, is inputted to computer 7 and read in shift register 81 in response to the clock of the pulse output of encoder 21. In case the measurement signal corresponding to the axial runout is to be analog processed, the data stored in shift register 81 are read out in response to the clock of the output pulse signal of oscillator 82 and inputted to correcting arithmetic block 84. Correcting arithmetic block 84 corrects the positional error of measuring head 3 in the axial direction, the tilt error of the optical disk mounting head and deformation coming from the rotation of disk 1. Thus, if these corrected outputs are fed to analog meter 86 after they have been subjected to D/A conversion, it is possible to obtain the measurement signal having the same time axis as that when disk 1 is rotated at the rated speed so that analog frequency analysis can be performed.

Figure 8:
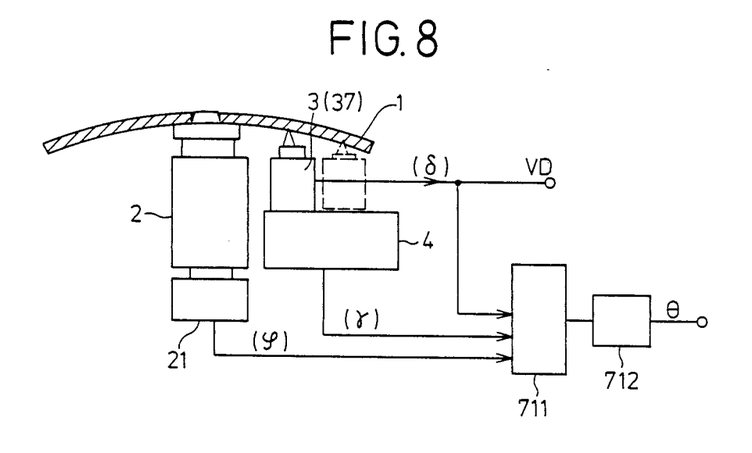
FIG. 8 is a diagram depicting the principle of tilt measurement.

FIG. 8 depicts apparatus for explaining the principle of tilt measurement and comprising a memory 711 for storing a measurement signal VD corresponding to the axial runout δ, which is obtained by measuring head 3 (i.e. the displacement detector 37) as well as the information of the measurement point, which concerns the angle of rotation φ determined from the output pulse of encoder 21 and the distance of measuring head 3 from the center of rotation 0 of disk 1; and tilt computing means 712 for computing the runout, i.e. the tilt of disk 1 by using the measured information δ, φ and r stored in memory 711. These functions are inclusive in computer 7.

Figure 9:
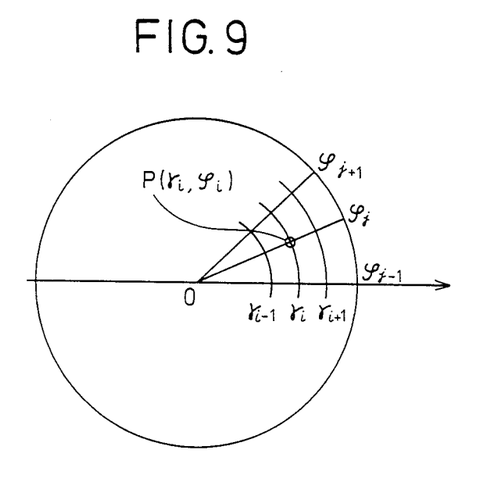
FIGS. 9 and 10 are diagrams depicting the geometric shape of the optical disk to explain the computer of tilt in the system of FIG. 8.
Figure 10:
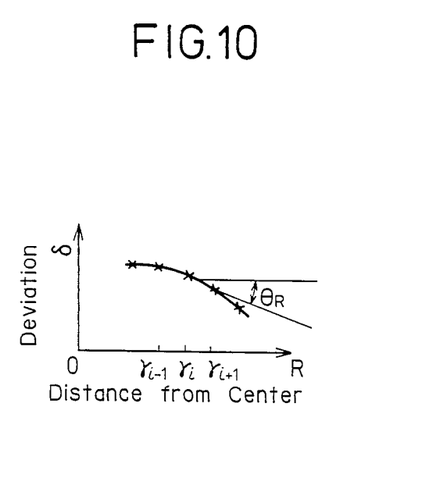

The operation of the arithmetic means 712 is now explained with reference to FIGS. 9 and 10, wherein disk 1 has thereon imagined in the form of a lattice a point P ($r_i$, $\phi_j$), of which the ordinates $r_1, r_2, \ldots, r_{i-1}$, $r_i$ and $r_{i+1}$ are assigned in the radial direction whereas the ordinates $\phi_1, \phi_2, \ldots, \phi_{j-1}, \phi_j$, and $\phi_{j+1}$ are assigned in the direction of rotation.

In a manner corresponding to the lattice shaped point P ($r_i$, $\phi_j$), the axial runout δ ($r_i$, $\phi_j$) is measured in accordance with the rotations of disk 1 and the movement of measuring head 3 and is sent to memory 711. Next, the tilt θ at each point P ($r_i$, $\phi_j$) is determined by the tilt computing means 712. The tilt θ is decomposed in the radial direction $\theta_R$ and in the direction of the angle of rotation $\theta_\phi$ and determined by the following equations $$\theta_R(r_i, \phi_j) = \frac{\delta(r_{i+1}, \phi_j) - \delta(r_{i-1}, \phi_j)}{r_{i+1} - r_{i-1}} \quad (1)$$

$$\theta_\phi(r_i, \phi_j) = \frac{\delta(r_i, \phi_{j+1}) - \delta(r_i, \phi_{j-1})}{r_i(\theta_{j+1} - \theta_{j-1})} \quad (2)$$

Moreover, the absolute avalue $|\theta|$ is determined by the following equation.

$$|\theta(r_i, \phi_j)| = \sqrt{\theta_R^2(r_i, \phi_j) + \theta_\phi^2(r_1, \phi_j)} \quad (3)$$

The tilt can be determined not by using the runout δ($r_i$, $\phi_j$) directly but making an equation of a curved surface which can suit the best points aroudn the point P ($r_i$, $\phi_j$), so as to reduce the influences of errors in the measurement.

Now, in case the axial runout, or the like, is to be measured as above, it is necessary to correct the vertical axis error of spindle motor 2 clamping disk 1.

Figure 11:
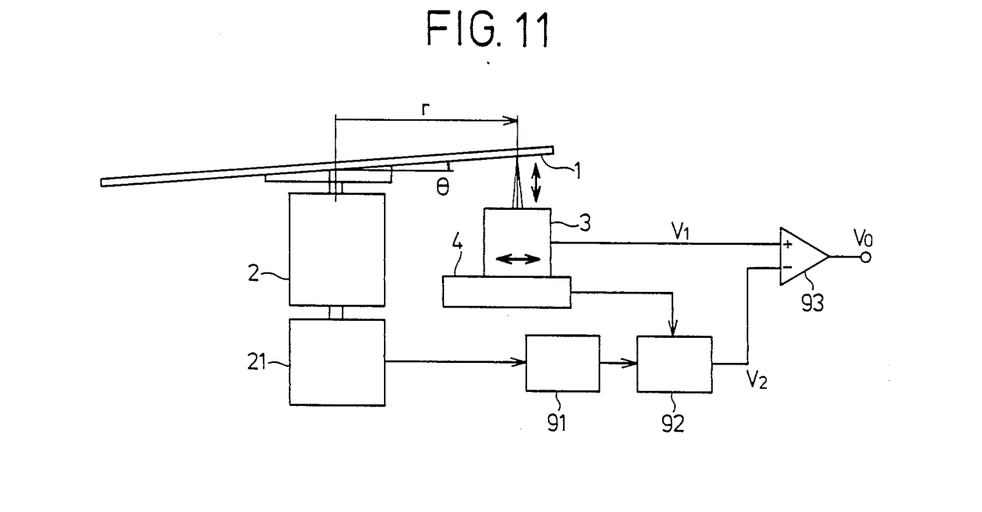
FIG. 11 is a diagram depicting an illustrative embodiment used for correcting the vertical axis error of a spindle motor.

FIG. 11 depicts a system used for correcting the vertical axis error of the spindle motor 2, comprising a staticizer 91 for expressing the pulse signal which is outputted from encoder 21, in a spacially coexisting state; an error eraser 92 for outputting a signal corresponding to the vertical axis error of disk 1 in accordance with the angle of rotation φ of disk 1 stored by staticizer 91, and a differential amplifier 93 for producing a difference between the output V1 of measuring head 3 and output V2 of error eraser 92.

Figure 12A:
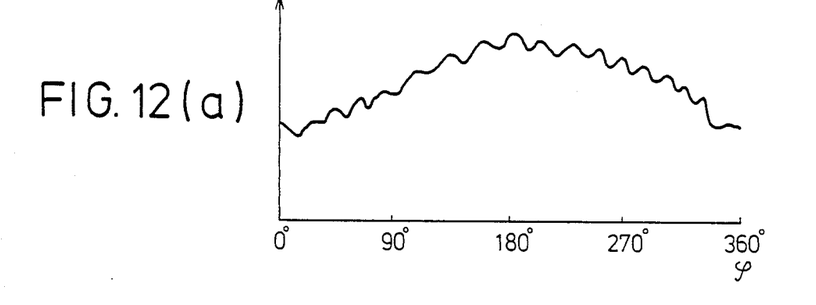
FIGS. 12(A), 12(B) and 12(C) are graphs for explaining the correction method.
Figure 12B:
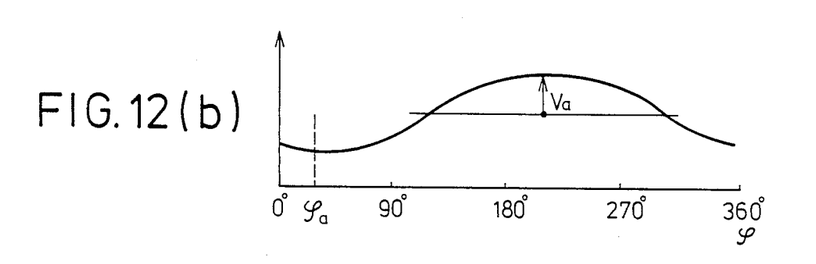
Figure 12C:
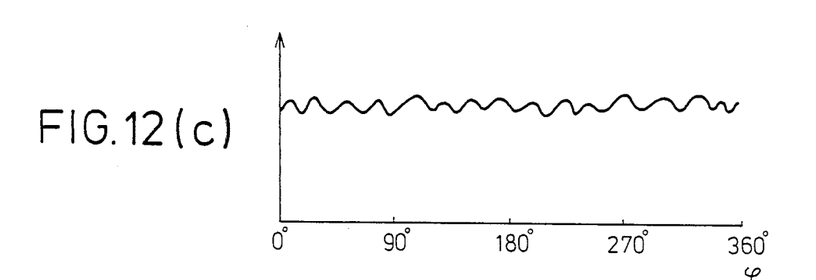

FIGS. 12(A), 12(B) and 12(C) are graphs for explaining the operation of FIG. 11. The axial runout error $\delta_\epsilon(\phi)$ due to the vertical axis error θ is given by the following equation.

$$\delta_\epsilon(\phi) = \frac{r\theta}{\rho} \sin n(\phi + \phi_\epsilon) \quad (4)$$

wherein φ is the angle of rotation |degs| of the optical disk 1; r is the gap from measuring head 3 to the center of rotation; ξ is a numerical value having a value 57.296 |degs/rad| for converting the degree value into a radian value; and $\phi_\epsilon$ is the phase angle in the difference between the start position of the encoder 21 and the angle of the vertical axis.

Next, the axial runout $\delta_D(\phi)$ of disk 1 is expressed with a Fourier coefficient by using the angle referring to the first mounting state.

$$\delta_D(\phi) = \sum_{n=1}^{\infty} {}_n \sin n(\phi + \phi_n) \quad (5)$$

Then, output V1 of measuring head 3 is given by the following equation with the signal being shown in FIG. 12(A).

$$V1(\phi) = \delta_D(\phi) + \delta_\epsilon(\phi) \quad (6)$$

As a result, the output of the signal shown in FIG. 12(B), given by the following equation, is outputted from error eraser 92.

$$V2(\phi) = \delta_\epsilon(\phi) = \frac{R\theta}{\rho} \sin n(\phi + \phi_\epsilon) \quad (7)$$

If the difference between the signals of equations (6) and (7) is provided by differential amplifier 93, it is possible to determine the axial runout $\delta_D(\phi)$ of disk 1, as shown in FIG. 12(C). Vertical axis error θ indispensable for error eraser 92 and direction $\phi_\epsilon$ on the turntable are measured by using a reference disk having a rotating face of excellent flatness.

Figure 13:
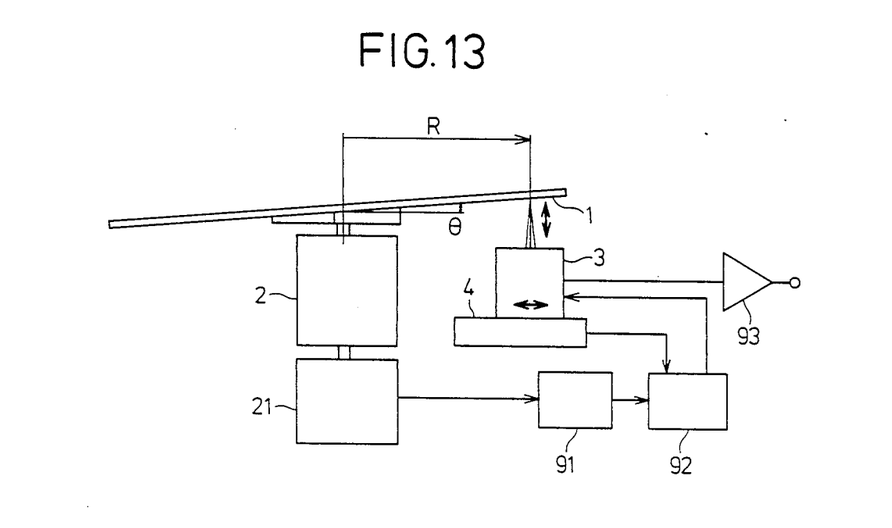
FIG. 13 is a diagram depicting another illustrative embodiment used for correcting the vertical axis error.

FIG. 13 depicts another system used for correcting the vertical axis error, wherein the output of error eraser 92 is connected with the focal position adjustor (i.e. lens actuator 33) built in measuring head 3.

Since the signal corresponding to the vertical axis error $\delta_\epsilon(\phi)$ is introduced into the focal position adjustor, the output of measuring head 3 is freed from the influences of vertical axis error.

In case the entire surface of disk 1 is scanned, on the other hand, the vertical axis error $\delta_\epsilon^*(\phi)$ may be determined at a specified distance R, and the signal, corresponding to the vertical axis error $\delta_\epsilon^*(\phi) \cdot (r/R)$ in proportion to the distance r of measuring head 3, is outputted from error eraser 92.

The substrate thickness is measured from the difference in the displacement outputs when the surface and back (i.e. recording face) of disk 1 are sequentially subjected to focusing servo. A focus error detecting system for the surface is added to the optical system for the focusing servo so that the measurements may be reliable within the moving range of ±1 mm of the focusing lens 31.

Figure 14:
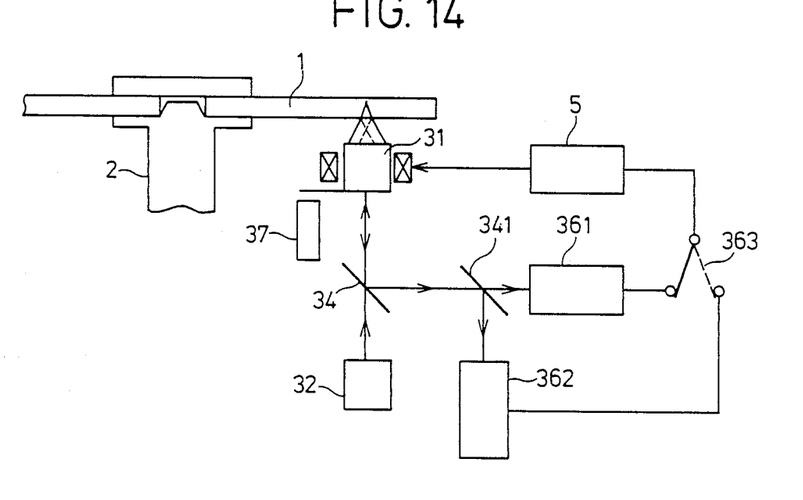
FIG. 14 is a diagram depicting an illustrative embodiment used for measuring the substrate thickness.
Figure 15:
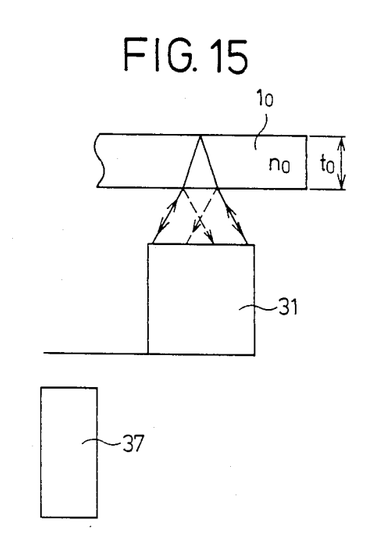
FIGS. 15, 16, 17 and 18 are diagrams for explaining the measuring operations of the system of FIG. 14.

FIG. 14 depicts a system for measuring the substrate thickness comprising a half mirror 341; a first focal state detector 361 comprising the above mentioned light receiving elements 36, or the like; a second focal state detector 362; a change over switch 363 for feeding the outputs of first and second focal state detectors 361 and 362 selectively to controller 5 (i.e. the servo amplifier). The first focal state detector 361 is constructed to have a zero output when the recording face of disk 1 is focus d. On the other hand, the second focal state detector 362 is constructed to have a sensitivity only to the reflected beam coming from the transparent surface of disk 1, if the optical disk $1_0$ used, has known reflectivity $n_0$ and thickness $t_0$ and is focused on its recording face, and to have a zero output.

Figure 16:
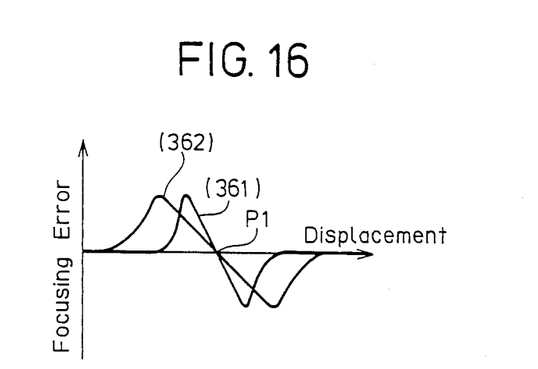

The resulting sensitivity characteristics of the first and second detectors 361 and 362 at this time are plotted in FIG. 16. In the focal position P1 in which the recording face is focused, more specifically, both the first and second focal state detectors 361 and 362 are zero so that the focus error is generated around that focal position P1.

Figure 17:
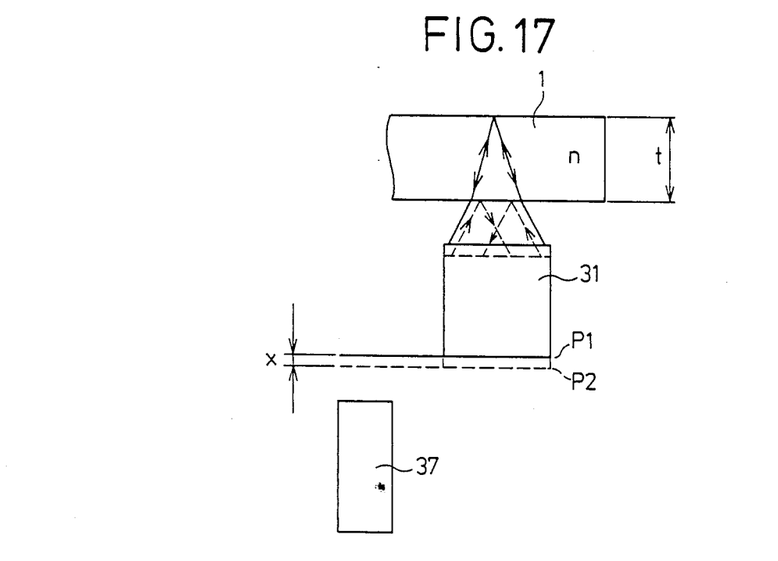
Figure 18:
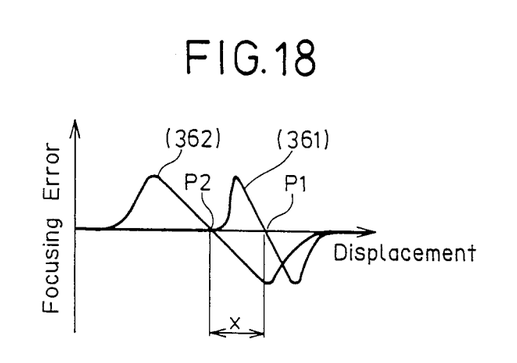

In the substrate thickness measuring system of FIG. 14, the measuring operations are as follows, assuming that disk 1 being measured has a reflectivity n and thickness t. First, change over witch 363 is connected with first focal state detector 361, and recordinf face of disk 1 is focused, as shown in FIG. 17, by making use of the output of first focal state detector 361. At this time, in case the reflectivity n and thickness t of disk 1 are different from reflectivity $n_0$ and thickness $t_0$, of disk $1_0$, the outputuof second focal state detector 362 is not zero even if the output (i.e. the focus error) of the first focal state detector 361 is zero. This behavior is shown in FIG. 18. In FIGS. 17 and 18, the point P1 represents a point at which the recordinf film is focused.

Next, change over switch 363 is changed to the second focal state detector 362 so that the position of focusing lens 31 is displaced to reduce the output of second focal state detector 362 to zero. The position (i.e. focal position) in which the second focal state detector 362 takes the zero output is designated as P2 in FIG. 18.

If the displacement of focusing lens 31 at this time is designated as x, the thickness t of the disk 1 is determined from the following equation.

$$t = (t_0/n_0 + x)n = t_0 n/n_0 + x \cdot n$$

wherein for $n \approx n_0$ and $t \approx t_0$, the displacement x is far smaller than the thickness t of disk 1 so that the thickness t of disk 1 can be measured by focusing lens 31 of the small stroke and displacement detector 37. Since the necessary stroke is small, moreover, the actuator of focusing lens 31 and displacement detector 37 can be used in the vicinity of the neutral point at which the controllability is best.

Thus, in the optical disk test system of the invention, the displacement of focusing lens 31 of measuring head 3 is directly detected by displacement detector 37, which detector is of the optical type. As a result, the invention has a simple structure and can detect the displacements of the focusing lens 31 accurately in the focusing and tracking directions thereby to measure the mechanical characteristics of the optical disk accurately Next, the protecting system of the invention will be described with reference to FIG. 19, which depicts a protecting mechanism for preventing a calibrating member from being damaged by errors of the feed mechanism, or the like, when the displacement detector 37 is being calibrated. The protecting mechanism comprises a calibrating member 10 which is set on feed mechanism 4 for calibrating displacement detector 37. Calibrating member 10 has a disk member to be positioned on measuring head 3, for example, for calibrating displacement detector 37 by moving up and down the disk member in a suitable manner and by measuring the displacement of the disk member at this time with a scale. Also provided is a drive motor 41 of the feed mechanism 4; a drive circuit 42 for driving the drive motor 41 in response to the command of controller 5, or the like; a detector 43 having a microswitch or a proximity switch for detecting that calibrating member 10 is set on the feed mechanism; a switch 44 inserted into a portion of drive circuit 42 for interrupting drive circuit 42 in response to the detected output of detector 43. Switch 44 can make use of the contact output of detector 43. Moreover, the position of insertion of switch 44 is not limited to the input side of drive circuit 42, by may also be located at the power line of drive motor 41.

Figure 19:
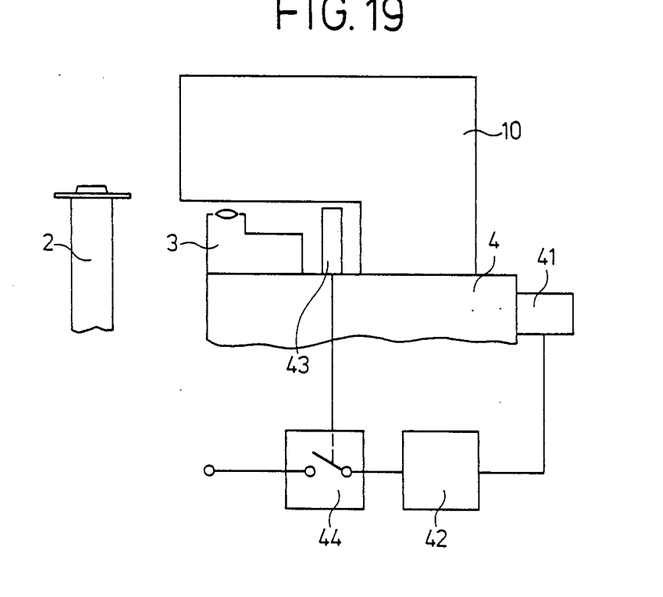
FIG. 19 is a diagram depicting a mechanism for protecting the feed mechanism during calibration.

In the protecting mechanism of FIG. 19, switch 44 is always OFF so that drive circuit 42 is interrupted, with calibrating member 10 being set on feed mechanism 4. Even in case the drive comman of the feed mechanism is generated by problems or errors of the system, the drive power signal is not applied to drive motor 41 so that the errors of the feed mechanism 4 can be prevented. As a result, calibrating member 10 can be prevented from impinging upon spindle motor 2, or the like, by errors of the feed mechanism so that the calibrating member 10 can be protected without fail.

Figure 20:
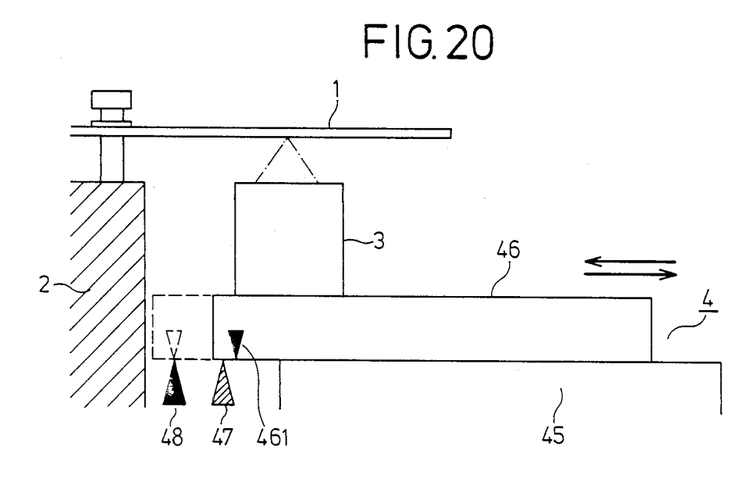
FIG. 20 is a diagram depicting a limiter mechanism of a slide portion of the feed mechanism.

FIG. 20 depicts a limiter mechanism for limiting the moving range of the slide of feed mechanism 4 so that measuring head 3, or the like, carried on feed mechanism 4 may be prevented from impinging upon spindle motor 2 or therearound and from being damaged. The limiter comprises a stationary portion 45 and a slide portion 46. Measuring head 3, or the like, is carried on slide portion 46 so that the irradiating, or measuring, position of the laser beam is moved in the radial direction of disk 1 as slide portion 46 slides. Also, provided are detectors 47 and 48 made of microswitches or proximity switches for detecting the passage of end 461 of slide portion 46.

In the limiter mechanism of FIG. 20, the moving velocity of slide portion 46 is decelerated in accordance with the output of detector 47 to halt slide portion 46. This make it possible to accelerate the moving velocity of slide portion 46 until the limit position is reached and to halt the slide portion reliably with little overshoot. As a result, measuring head 3, etc, carried on slide portion 46 can be reliably protected against any damage.

Advantageously, the invention is simple, and can accurately detect the displacements of the focusing lens in the focusing and tracking directions thereby to accurately measure the mechanical characteristic of the optical disks.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A test system for optical disks, comprising
a spindle motor for clamping and rotating an optical disk at a constant speed;
an encoder for generating a pulse output corresponding to the angle of rotation of said spindle motor;
a measuring head for measuring the shape of said optical disk, said measuring head comprising focus servo and tracking servo mechanisms for causing the focal point of a laser beam irradiating said optical disk to follow the guide groove of said optical disk, and a displacement detector for optically detecting the displacement of a focusing lens driven by said servo mechanisms to generate an output signal from said measuring head proportional to the displacement of said focusing lens;
a feed mechanism for moving said measuring head in the radial direction of said optical disk;
a controller for controlling the operations of said spindle motor, the focus servo and tracking servo mechanisms of said measuring head, and said feed mechanism;
an analog to digital converter for analog to digital converting the output from said measuring head at a timing according to the pulse output of said encoder and producing an output indicative thereof; and
a computer for commanding said controller and for computing the output signal from said analog to digital converter to determine the shape of said optical disk solely by the use of displacement related output signal from the measuring head.

2. A test system for optical disks, comprising
a spindle motor for clamping and rotating an optical disk at a constant speed;
an encoder for generating a pulse output corresponding to the angle of rotation of said spindle motor;
a measuring head comprising focus servo and tracking servo mechanisms for causing the focal point of a laser beam irradiating said optical disk to follow the guide groove of said optical disk, and a displacement detector for optically detecting the displacement of a focusing lens driven by said servo mechanisms, said measuring head being operative to generate an output signal proportional to the displacement of said focusing lens;
a feed mechanism for moving said measuring head in the radial direction of said optical disk;
a controller for controlling the operations of said spindle motor, the focus servo and tracking servo mechanisms of said measuring head, and said feed mechanism;
an analog to digital converter for analog to digital converting the output of said measuring head at a timing according to the pulse output of said encoder; and
a computer for commanding said controller and for computing the output of said analog to digital converter to determine the shape of said optical disk;
wherein said measuring head comprises a shielding plate having a rectangular aperture and arranged in a plane containing the focusing and tracking directions of said focusing lens while being fixed relative to said focusing lens; a light source for irradiating said shielding plate with a parallel beam having a spot diameter larger than the range of movement of said aperture; and a multi-divided sensor for detecting the light having passed through the aperture of said shielding plate; and wherein said displacement detector detects the displacement of said focusing lens by using the output signals from said multi-divided sensor.

3. The system of claim 2, wherein said displacement detector has a feedback circuit for detecting the total sum of the output signals from said multi-divided sensors coming from respective light receiving faces to control the amount of emission of said light source such that the total sum always takes a constant value.

4. The system of claim 2, wherein said controller comprises means for rotating said spindle motor at a speed lower than a rated speed of roration.

5. The system of claim 2, wherein said computer comprises a memory for storing the output signal from said measuring head corresponding to the axial runout of said optical disk together with data of point of measurement so that tilt is computed from the axial runout of said optical disk.

6. The system of claim 2, wherein said controller comprises an error eraser for generating a signal corresponding to that error of the vertical axis of said spindle motor, said error being measured in advance by making use of a reference disk, in accordance with the pulse output of said encoder so that the output signal from said measuring head is corrected in accordance with the output of said error eraser.

7. The system of claim 2, wherein said measuring head comprises a first focal state detector for detecting whether or not the recording film of said optical disk is focused; a second focal state detector made receptive to the reflected beam shared with said first focal state detector; and a change over switch for feeding back the outputs from said first focal state detector and from said second focal state detector selectively to said controller when a plate thickness is measured; and wherein said second focal state detector is made sensitive only to the reflected beam coming from the surface of the transparent side of an optical disk having known reflectivity and thickness to generate a zero output when the recording face of said known optical disk is focused.

* * * * *